Figure 1:
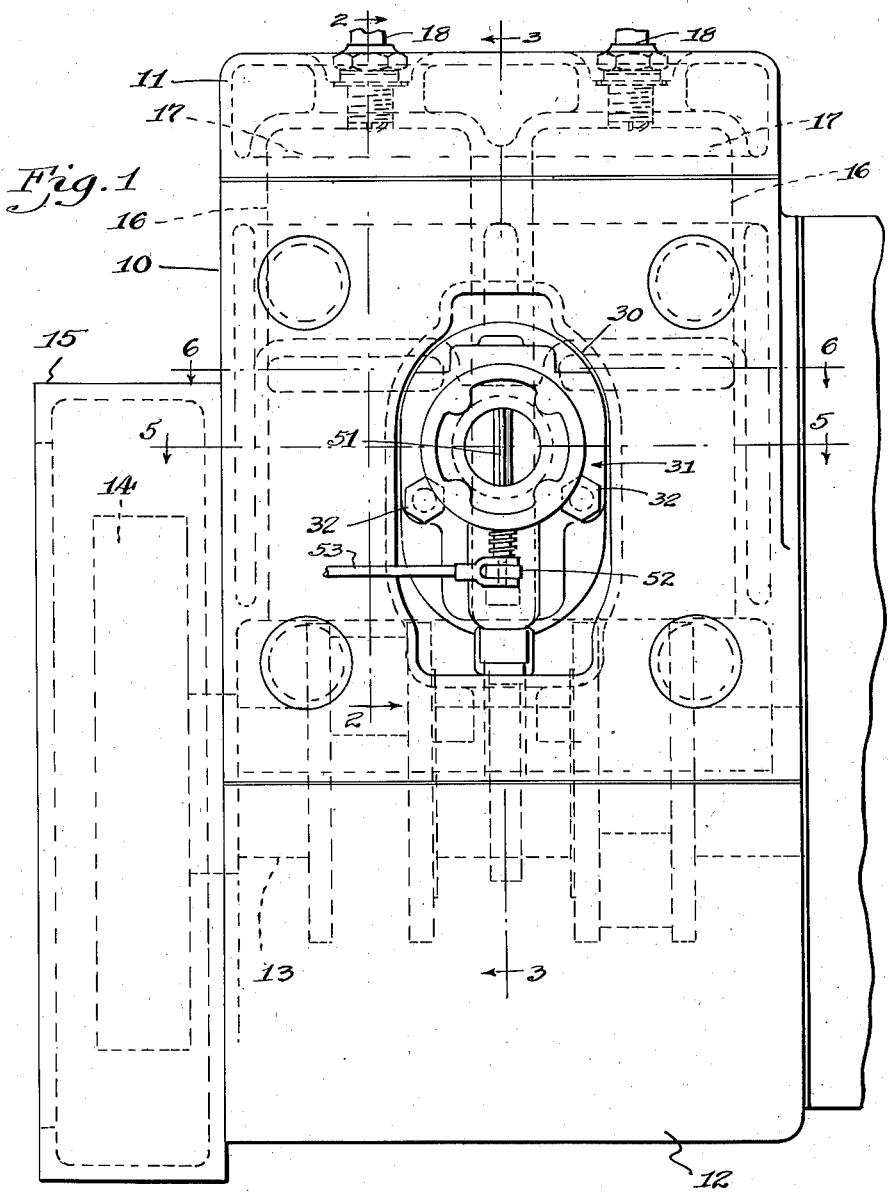

Dec. 23, 1941.  E. R. JACOBY ET AL  2,267,333
ENGINE
Filed Dec. 1, 1939   6 Sheets-Sheet 1

INVENTORS
Enos R. Jacoby
Earl Ginn
BY
ATTORNEY.

Dec. 23, 1941.  E. R. JACOBY ET AL  2,267,333
ENGINE
Filed Dec. 1, 1939  6 Sheets-Sheet 2
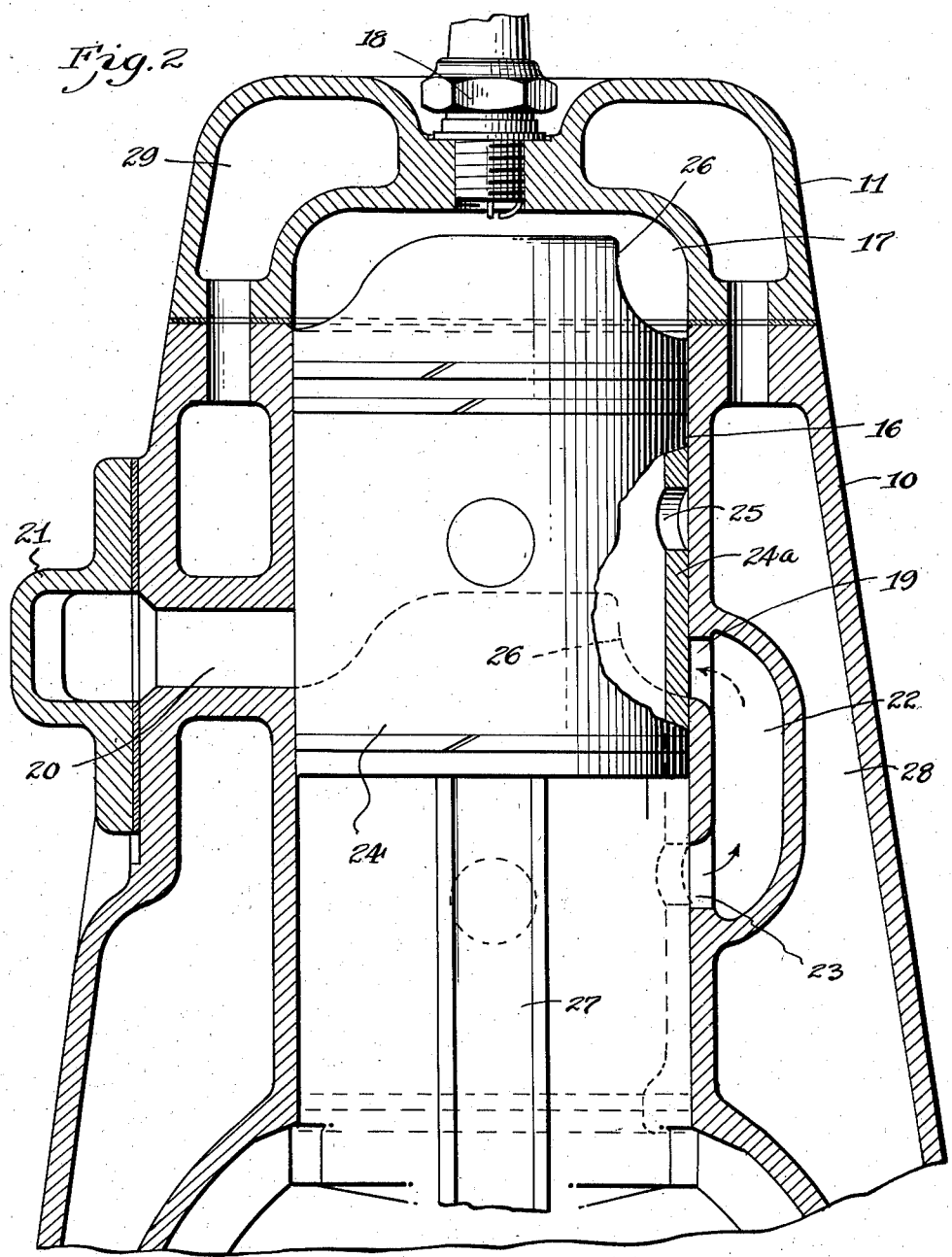
INVENTORS
Enos R. Jacoby
Earl Ginn
BY G. F. Hauke
ATTORNEY.

Dec. 23, 1941.   E. R. JACOBY ET AL   2,267,333
ENGINE
Filed Dec. 1, 1939   6 Sheets-Sheet 3
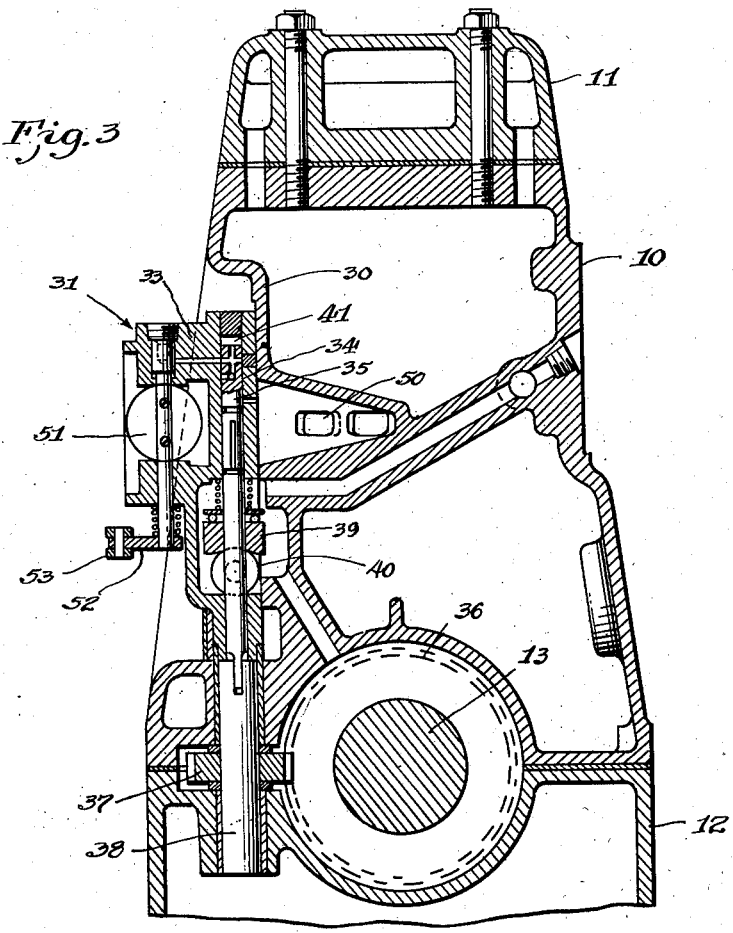
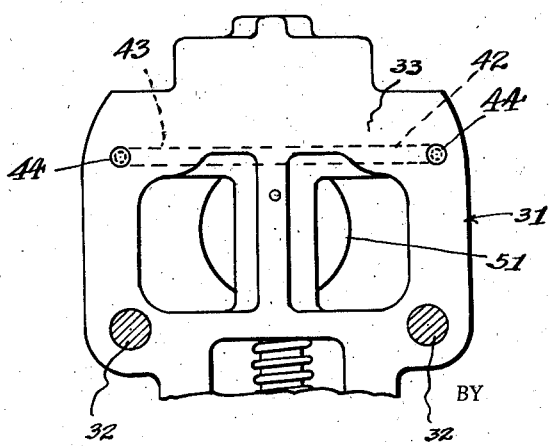
INVENTORS
Enos R. Jacoby
Earl Ginn
BY
ATTORNEY.

Dec. 23, 1941.   E. R. JACOBY ET AL   2,267,333
ENGINE
Filed Dec. 1, 1939   6 Sheets-Sheet 4

INVENTORS
Enos R. Jacoby
Earl Cinn
BY G. F. Hawke
ATTORNEY.

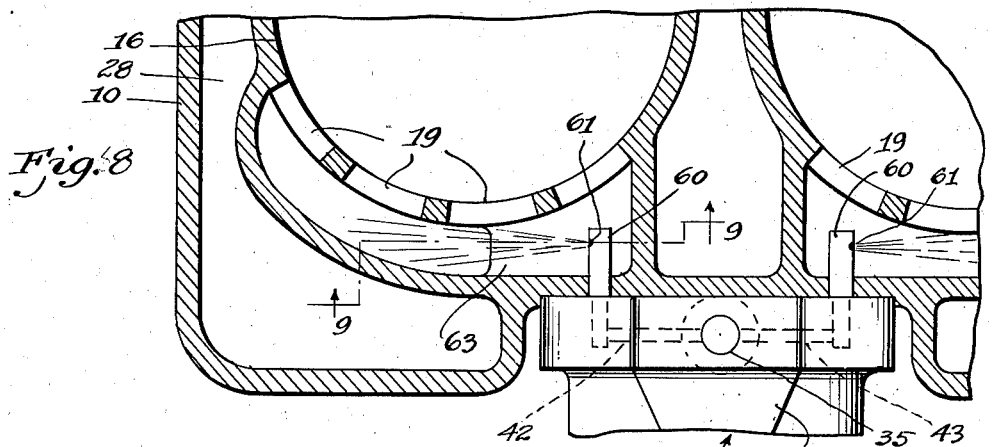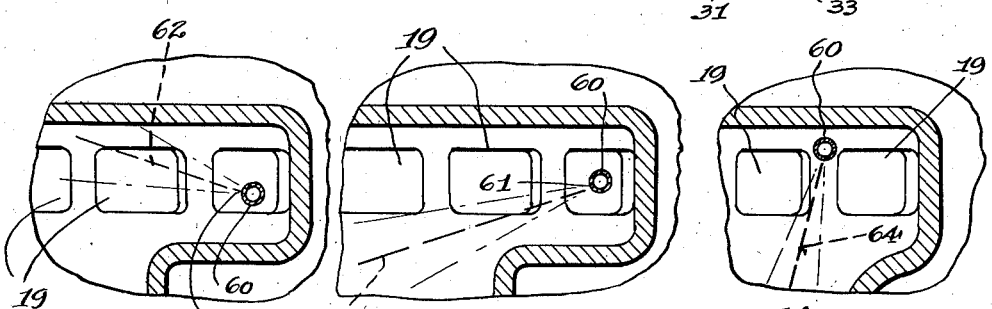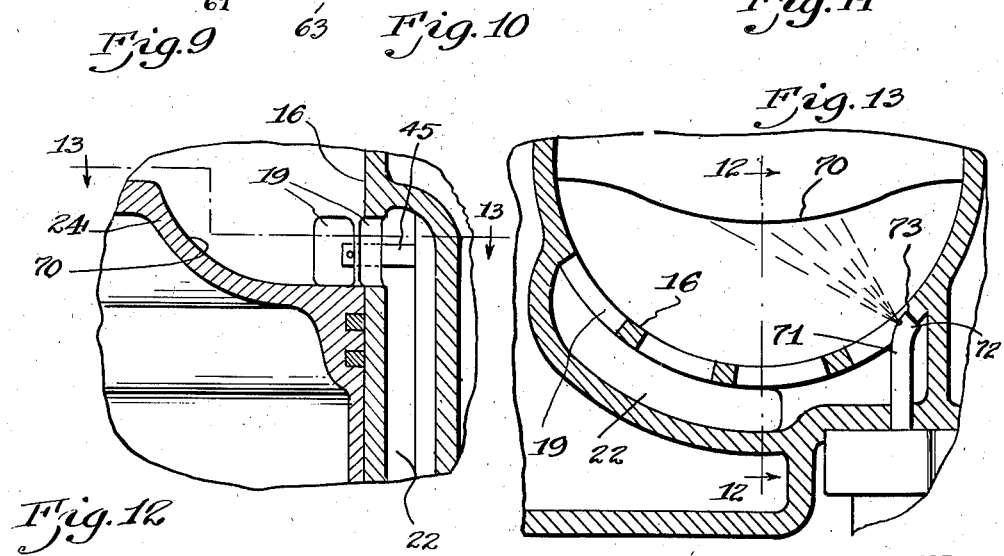

Dec. 23, 1941.　　　E. R. JACOBY ET AL　　　2,267,333
ENGINE
Filed Dec. 1, 1939　　　6 Sheets-Sheet 6
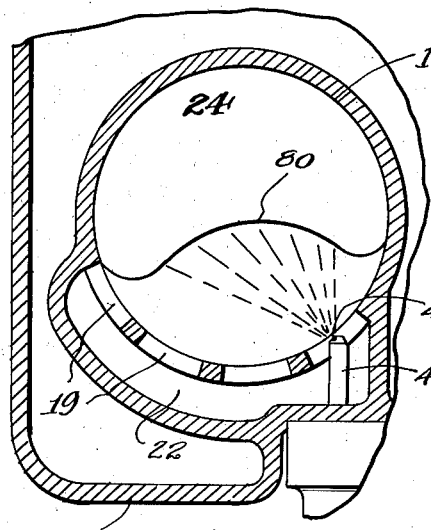
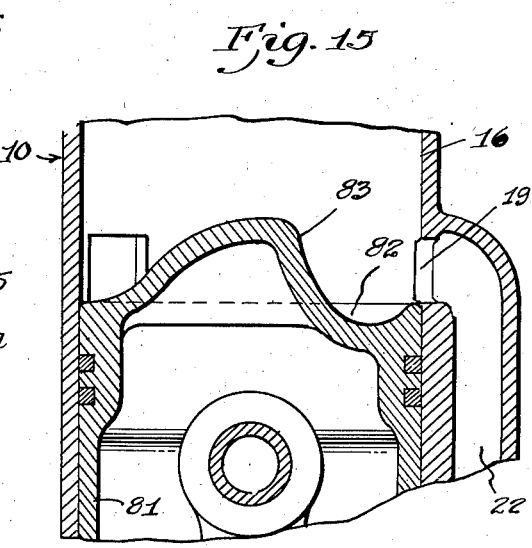
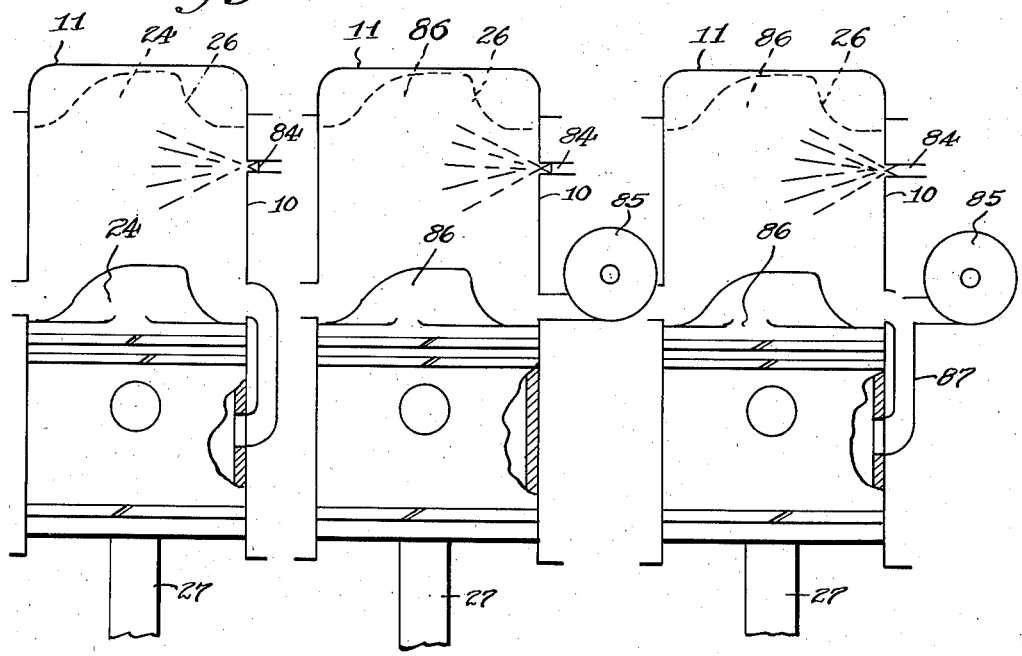
INVENTORS
Enos R. Jacoby
Earl Ginn
BY
ATTORNEY.

Patented Dec. 23, 1941

2,267,333

UNITED STATES PATENT OFFICE 2,267,333

ENGINE

Enos R. Jacoby, Muskegon, and Earl Ginn, North Muskegon, Mich., assignors, by mesne assignments, to Reconstruction Finance Corporation, Detroit, Mich.

Application December 1, 1939, Serial No. 307,168

14 Claims. (Cl. 123—73)

Our invention relates to engines and more particularly to a two stroke cycle fuel injection engine in which pure air is preferably supplied to the engine cylinder from the engine crankcase or from an external source of air supply. In most instances we find it desirable to employ crankcase compression.

It is well known that much difficulty has been experienced with two stroke cycle engines heretofore manufactured. One of the chief troubles with two stroke cycle engines is that they can only be started after much difficulty. Also, the excessive oil consumption in a two stroke cycle engine is one which has made the practical production of such engines undesirable. Past experience with two stroke cycle engines have shown that these engines are not reliable, they are difficult to start, particularly in cold weather, are difficult to cool and usually consume an excessive amount of lubricating oil. Furthermore in most two stroke cycle engines the fuel is subject to condensation, especially when cold and this adds to the starting difficulties and the fuel condensed from the mixture in the cylinder tends to drain into the crankcase and washes the lubricating oil from the cylinder walls.

An object of our present invention is to provide a two stroke cycle combustion engine in which the aforesaid difficulties have been substantially removed by incorporating therewith a fuel injection system particularly constructed and arranged for this particular application.

Another object of our present invention is to provide for more efficient combustion in the engine, to eliminate wastage of fuel and to further improve the combustible characteristics of the combustible charge within the engine, by providing a fuel injection system which is operable in time relation with the engine operation and which is further constructed and arranged in such a way as to preferably inject the fuel substantially directly into the engine cylinder, and utilizing the engine crankcase in most instances for compression of pure air instead of a fuel and air mixture as has heretofore been the practice.

Another object of our present invention is to provide an improved two stroke cycle engine of the character described by so mounting the injector and its associated parts, that the fuel may be injected or sprayed into pure air substantially at the same time that said pure air is introduced into the engine cylinder, which construction has practically eliminated all chances of fuel being precipitated out of the mixture into the crankcase, thus making it possible to secure a uniform fuel mixture charge for the engine with a minimum of waste under all conditions of engine operation.

Still another object of our invention is to provide an improved two stroke cycle fuel injection engine which is rather simple in design but which utilizes to the fullest extent all the fuel injected into the engine and which provides a more efficient engine as compared to previous two stroke cycle engines.

A further object of our invention is to provide a more efficient two stroke cycle engine by injecting the fuel substantially directly into the engine cylinder and by commencing this injection of fuel substantially at the beginning of the compression stroke and after the exhaust ports have been closed. In other words the fuel is injected into the engine cylinder under the most favorable conditions, and when the pressure in said cylinder is substantially atmospheric. The preferred constructions herein illustrated provide an arrangement whereby the fuel injecting device is shielded from substantial maximum temperatures and pressures in the engine cylinder.

A still further object of our present invention is to facilitate the manufacture of such engines by providing a structure requiring a minimum number of moving parts and which can be assembled with a minimum of time and labor.

Figure 5:
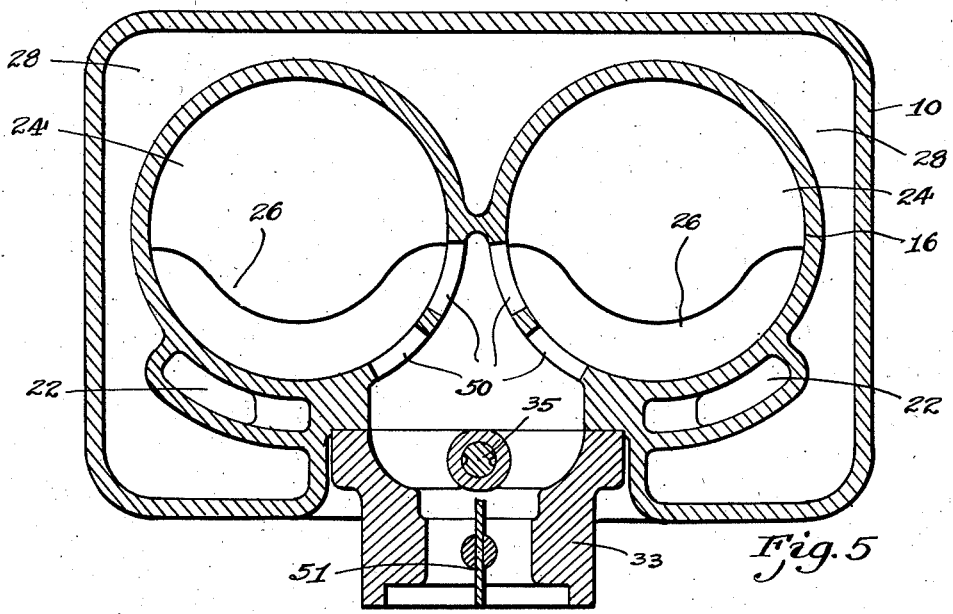
Figure 6:
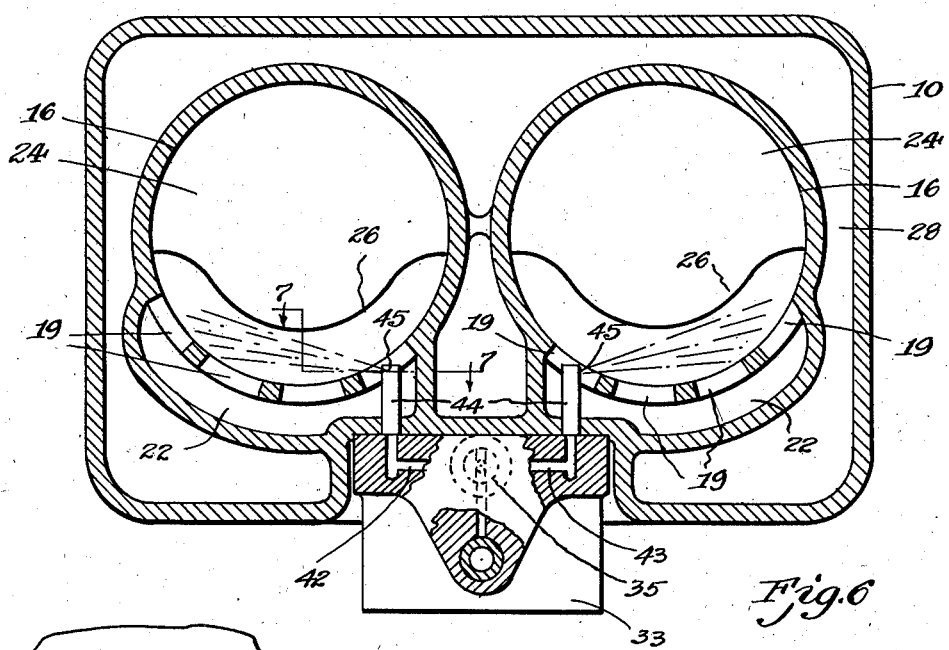
Figure 7:
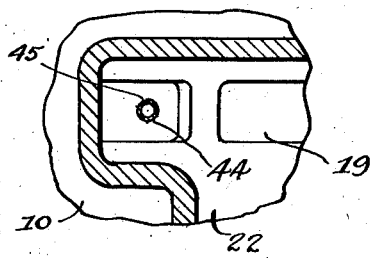

For a more detailed understanding of our invention, reference may be had to the accompanying drawings and specification illustrating preferred embodiments of our invention by which is obtained substantially improved results, and in which:

Fig. 1 is a side elevational view of a two stroke cycle fuel injection engine showing a fuel injection device assembled therewith, Fig. 2 is a vertical transverse sectional view through the engine taken substantially on the line 2—2 of Fig. 1 and showing the relation of the transfer passage, piston and cylinder intake ports, Fig. 3 is a vertical transverse sectional view taken substantially on the line 3—3 of Fig. 1 and showing the mechanism for actuating the fuel injecting device, Fig. 4 is a fragmentary detail view of the injecting device, showing the air intake and fuel distributing conduits, Fig. 5 is a horizontal sectional view through the engine taken substantially on the line 5—5 of Fig. 1, but showing the piston in plan elevation, Fig. 6 is a similar horizontal sectional view of the engine taken substantially on the line 6—6 of Fig. 1 and showing the preferred arrangement whereby fuel is injected substantially directly into the engine cylinder, Fig. 7 is a detail sectional view showing the fuel injecting jet in relation to the cylinder intake ports and taken substantially on the line 7—7 of Fig. 6, Fig. 8 is a horizontal sectional view through the engine taken on the line similar to sectional view Fig. 6, and illustrating a modified fuel injecting construction, Fig. 9 is a fragmentary detail sectional view of the injector jet taken on the line 9—9 of Fig. 8 and showing the relation of said jet with respect to the cylinder intake ports, Fig. 10 is a similar fragmentary sectional view showing a further modified construction, Fig. 11 is a similar fragmentary sectional view showing a still further modified form of construction, Fig. 12 is a fragmentary vertical sectional view taken substantially on the line 12—12 of Fig. 13 and showing the injector with relation to the cylinder intake port and piston, and illustrating a modified piston construction, Fig. 13 is a fragmentary horizontal sectional view of the construction as illustrated in Fig. 12 and taken substantially on the line 13—13 of Fig. 12, Fig. 14 is a plan view of a piston showing a modified baffle construction, Fig. 15 is a vertical sectional view of a modified piston construction, showing the piston top face provided with a fuel condensation pocket, Fig. 16 is a modified engine construction showing the fuel injection device operable to inject the fuel directly into the engine cylinder, Fig. 17 is a further modified engine construction showing an external source of pure air supply, and Fig. 18 is a still further modified engine construction showing an engine having an external air blower for completely scavenging the engine prior to fuel injection.

Our present invention is illustrated preferably in connection with a small two cylinder engine but it will be understood, however, that the principles of our invention may be incorporated in other size engines as well. The present two stroke cycle engine consists in general of a cylinder block 10 to which is secured a cylinder head 11 and a crankcase 12. A crankshaft 13 is supported in the crankcase in the usual manner, and has secured thereon a fly wheel 14 housed within the fly wheel housing 15. The cylinder block 10 is provided with cylinders 16 and the combustion chamber 17 for each cylinder is confined for the most part within the cylinder head 11. Conventional spark plugs 18 are carried by the cylinder head for igniting the combustible charge in the combustion chambers at the desired times. Each cylinder is provided with intake and exhaust ports 19 and 20 respectively, the exhaust port 20 communicating in a conventional manner with a suitable exhaust manifold 21.

As will be observed in Fig. 2 the cylinder structure provides a transfer passage 22 communicating at one end with the cylinder intake port 19 and at the other end with a cylinder port 23. A piston 24 is operable within the cylinder and controls the opening and closing of said cylinder intake and exhaust ports for controlling the engine cyclical events. It will be observed that the piston skirt 24a is provided with a port 25 adapted to register with the cylinder port 23 when the piston is near the bottom of its stroke at which time the pure air within the crankcase, which has been compressed by the inward movement of the piston during the power stroke of the engine, is caused to flow through the transfer passage 22 and into the cylinder through the intake ports 19, since at this time the piston has unmasked the cylinder intake and exhaust ports.

The incoming gases scavenge the engine cylinder in the usual way by pushing the exhaust gases out through the cylinder exhaust port or ports. The piston is provided with a baffle 26 which is adapted to screen the exhaust ports from the intake port and to deflect the incoming gases outwardly of the cylinder toward the cylinder head and to substantially completely scavenge the cylinder of exhaust gases in the conventional manner. The piston 24 is connected to the crankshaft 13 by the usual connecting rods 27, and the cylinder block and the cylinder head are provided with the usual water jackets 28 and 29 respectively.

We have found that a two stroke cycle engine can be operated satisfactorily and most efficiently by incorporating therewith a fuel injection system so constructed and arranged as to introduce the fuel into the pure air after the same is forced out or withdrawn from the crankcase. We preferably arrange our fuel injection system in such a way as to introduce the fuel and to mix the same with the pure air transferred to the cylinder from the crankcase in proximity to the cylinder intake ports 19, and preferably time the fuel injection device to inject the fuel after the cylinder has been scavenged of the products of combustion.

In Fig. 3 we have illustrated our preferred engine construction in section in order to show the fuel injecting device and it will be noted that the engine block 10 is provided with a recessed portion 30 forming a pad for receiving the fuel injection device, indicated in general by the reference character 31, and which is preferably secured to the engine structure by means of bolts or other suitable fastening devices 32. The fuel injector comprises a cast block member or housing 33 which provides a pump cylinder 34 in which is operated a pump plunger 35, same being rotated by means of a gear connection by the crankshaft 13, said crankshaft carrying a gear 36 meshing with gear 37 carried by or secured to a pump actuator 38. The pump carries a cam 39 reacting against a roller 40 so as to raise and lower the pump plunger when same is rotated.

The fuel is compressed in the pump chamber 41 and fed through ducts 42 and 43 respectively to the fuel injecting devices, such as tubes 44. These tubes 44 are each supported in the engine structure and terminate in an end portion provided with a plain jet opening or fuel injecting nozzle 45 located preferably in proximity to a cylinder intake port 19. It will be observed that the pump plunger is so operated as to time the injection of fuel into the engine cylinder from the nozzles or jets 45 in any convenient manner, and preferably the injection device is constructed to alternately and intermittently introduce the fuel into the ducts 42 and 43. This particular form of fuel injecting device and the detailed construction and operation form no part of the present invention and it will be understood that any type of fuel injecting mechanism may be incorporated with our invention, it being preferred, however, to time the actuation of said injecting device to inject the fuel at the proper time, to wit, during the compression stroke of the engine.

However, the construction and arrangement of the injecting device relative to the engine structure does form a part of our invention, and it will be noted that in one adaptation of our invention the fuel jets or nozzles are positioned preferably in a position as shown in Fig. 6 so that the fuel is sprayed directly into the engine cylinder through one of the cylinder intake ports, and at least some of the fuel is preferably sprayed against the baffle 26 carried by the piston. Actuation of the fuel injecting device is timed to inject the fuel into the engine cylinder when the piston has substantially reached the bottom of its stroke, preferably at the beginning of the compression stroke and in some cases after the exhaust port has been closed.

In a two stroke cycle engine of the crankcase compression type, pure air is drawn into the engine crankcase through the air ports 50 which ports are intermittently placed in communication with the crankcase by the unmasking of said ports by reason of the movement of the engine piston to the top of its stroke. A butterfly valve 51, actuated by a lever arm 52 and connector 53, is pivotally mounted within the injector housing 33, and same controls the supply of pure air to the crankcase. This pure air, on being compressed, is subsequently introduced into the transfer passage 22 and thence into the cylinder as has been previously described.

Figs. 8 to 11 inclusive illustrate various modified constructions by which substantially good results may be obtained. In Fig. 8 it will be noted that the tube 60 which communicated with the injector device 31 is shorter in length than that shown in Fig. 6 and the jet or nozzle 61 is located to spray the fuel into the transfer passage across the intake port openings 19. Thus the fuel is mixed with the pure air from the crankcase at the time the pure air is being introduced into the engine cylinder and may, if desired, be mixed with the pure air just before and during the introduction of the mixture into the engine cylinder. Preferably the jet or nozzle 61 is located adjacent one end of the chamber 63 formed by the upper portion of the transfer passage, and the fuel is sprayed in a direction which is substantially opposed to the directional flow of the pure air through the transfer passage. Thus, it will be noted that considerable turbulence is set up and a very fine atomization of fuel is obtained. It will also be noted that the jet or nozzle 61 may be arranged to direct the jet upwardly as indicated by the dotted line 62 in Fig. 9, slightly downwardly as indicated by the dotted line 63 in Fig. 10, or almost straight down as indicated by the dotted line 64 in Fig. 11. Preferably the jet or nozzle 45, as shown in the preferred engine construction illustrated in Fig. 6, is so positioned as to impart a directional force to the fuel spray substantially similar to that shown in Fig. 9; i. e., the fuel spray is directed slightly toward the piston baffle and toward the cylinder outer end, so as to lessen any tendency of the fuel being swept directly out through the exhaust ports ahead of the exhaust gases. Preferably, however, the fuel is sprayed or introduced into the engine cylinder after the exhaust port is closed and while the pressure in the engine cylinder is substantially atmospheric.

Further modified constructions are illustrated in Figs. 12 and 13. This modified construction provides a piston baffle 70 projecting outwardly from the piston face at a distance more remote from the cylinder intake ports than is the piston baffle 26. In some instances it is found that uniform distribution of the atomized fuel is had more readily by such a baffle construction. It will be noted that we may provide a piston baffle which may be of the general contour as illustrated at 80 in Fig. 14 and which may be located more or less closer to the cylinder intake ports. If desired, we may also arrange the fuel injector tube 71 as shown in Fig. 13, so that the extremity thereof is bent as at 72 and the jet or nozzle 73 is positioned to direct the fuel more towards the center of the piston face and more directly against the piston baffle.

In many instances we find that it is desirable to provide a condensation pocket 82 in the piston face immediately in front of the piston baffle 83 (see Fig. 15) in order to collect any condensation which may be precipitated out of the fuel mixture introduced into the engine cylinder when starting. The wet fuel is thus collected and thrown off as the piston 81 reverses its motion at the top of its stroke, thereby eliminating wastage of fuel and eliminating any tendency of this wet fuel to wash down the cylinder walls.

In Figs. 16 and 17, it will be noted that we have provided a fuel injection device 84 located to inject fuel directly into the engine cylinder during a portion of the engine compression stroke. We preferably inject the fuel after the exhaust port has been closed and continue the injection during about from fifty per cent (50%) to ninety per cent (90%) of the compression stroke. The injecting device is, however, preferably completely masked or shielded from the engine combustion chamber by the engine piston during the time of substantial maximum temperatures and pressures. It will be observed that the fuel and air mixture is preferably not rich enough to ignite by compression alone, and the spark is utilized to ignite the fuel mixture. The fuel is injected at relatively low pressure, and preferably the beginning of fuel injection occurs at a time when pressure within the cylinder are substantially atmospheric, and preferably immediately after the exhaust port is closed.

The engine illustrated in Fig. 16 is a crankcase compression type while in Fig. 17, the engine is provided with an external source of air supply, such as a low pressure blower 85. The control of the air supply from this blower is had by the piston 86 in a manner preferably the same as is the case with the other constructions illustrated herein, and this blower may be used alone as in Fig. 17 or in conjunction with a crankcase air supply as in Fig. 18. The blower may directly inject pure air into the cylinder or may if desired inject into the air transfer passage 87 (Fig. 18). It may be noted that the use of an external air supply, which may supply air in excess of the engine demands, provides for a substantially complete scavenging of the engine prior to fuel injection.

It will be observed that the present engine construction embodies a novel concept for obtaining more satisfactory two stroke cycle engine performance in that the fuel is sprayed either directly into the cylinder or into the transfer passage 22. We find it preferable in many instances however, to inject the fuel into that region of the transfer passage which is in proximity to the cylinder intake ports. The fuel is preferably mixed with the pure air just prior to being introduced to the engine cylinder or it is mixed with the air while the same is being introduced into the engine cylinder at the beginning of the engine compression stroke. In this way the pressure of the air and its velocity when being transferred from the crankcase to the cylinder acts to substantially prevent any of the fuel backing up into the crankcase. The fuel is also released into the air stream under pressure, and even though the fuel pressure is low, a thorough atomization of the fuel and a thorough mixing of the atomized fuel and air in the engine cylinder is obtained.

We also find that by introducing the fuel into the air stream substantially at the same time the gases are introduced into the engine cylinder, that a substantially uniform distribution and mixture of the fuel and air is obtained, which of course, aids in obtaining efficient combustion of the fuel mixture. When fuel is mixed with air for some time before same is introduced into the engine cylinder there is a tendency of the fuel to condense and to be precipitated out of the fuel mixture, causing a variation in the ratio of fuel and air which lessens engine efficiency, besides creating other operating difficulties.

Our present construction insures proper combustion at all times and provides a fuel mixture for combustible purposes which is affected by cold to a lesser degree than if the fuel is mixed with the air in the engine crankcase. When operating such engines under severe winter conditions and below zero temperatures, there is a tendency of the fuel condensing which will make it difficult to start the engine. In our present construction, there is a lesser chance of the fuel condensing when operating the engine under sub-zero temperatures and thus, it is found that a fuel injection two stroke cycle engine constructed in accordance with our invention and embodying the improvements described above, may be quickly started in sub-zero weather. Furthermore, continuous satisfactory engine operation is insured by our construction.

It will be noted that the inlet port 23 of the transfer passage is masked by the piston skirt during substantially the whole upward stroke of the piston, and therefore the suction effect produced in the engine crankcase is not transmitted to the transfer passage. Any fuel mixture in said transfer passage is thus substantially never subjected to the suction pressure in the crankcase, as the air intake ports 50 are unmasked preferably before the port 23 is unmasked, and the crankcase suction pressure is relieved before the transfer passage is opened to the crankcase.

It will be apparent therefore, that, although we have described in detail certain preferred forms of construction and have illustrated the principles of our invention as applied to preferred engine constructions, that various modifications and changes may be made therein without departing from the spirit of our invention and from the scope of the appended claims.

We claim:

1. A two stroke cycle internal combustion engine comprising an engine structure including a crankcase and a cylinder having a plurality of intake ports and exhaust port means, a crankshaft, a piston operatively connected with said crankshaft and operable to control at least in part the engine cyclical events, said engine structure having a transfer passage for conducting compressed air from the crankcase to the engine cylinder, said transfer passage including an arcuate chamber partially surrounding the cylinder and communicating with said cylinder intake ports, and fuel injecting means including an injector nozzle terminating within one of the intake ports and constructed and arranged to inject fuel directly into one of said intake ports and thence directly into said chamber.

2. A two stroke cycle internal combustion engine comprising an engine structure including a crankcase and a cylinder having intake and exhaust ports, a crankshaft, a piston operatively connected with said crankshaft and operable to control at least in part the opening and closing of the cylinder intake and exhaust ports to control the engine cyclical event, said engine structure having a transfer passage for conducting compressed air from the crankcase to the engine cylinder, said transfer passage including an arcuate chamber partially surrounding the cylinder and communicating with said cylinder intake ports, and fuel injecting means including an injector nozzle constructed and arranged to inject fuel directly into said chamber in a direction substantially opposed to the travel of air through said transfer passage.

3. A two stroke cycle internal combustion engine comprising an engine structure including a crankcase and a cylinder having a plurality of intake ports and exhaust port means, a crankshaft, a piston operatively connected with said crankshaft and operable to control at least in part the opening and closing of the cylinder intake and exhaust ports to control the engine cyclical events, said engine structure having a transfer passage for conducting compressed air from the crankcase to the engine cylinder, said transfer passage including an arcuate chamber partially surrounding the cylinder and communicating with said cylinder intake ports, and fuel injecting means including an injector nozzle constructed and arranged to inject fuel through said intake port only and thence directly into said chamber, said injector nozzle comprising a fuel conducting tube extending transversely of said chamber and having a jet opening located within only one of said cylinder intake ports through which the fuel is injected substantially directly into the engine cylinder.

4. A two stroke cycle internal combustion engine of the crankcase compression type comprising an engine structure including a crankcase, a crankshaft, a cylinder having intake and exhaust ports, and an air transfer passage connecting the crankcase with said cylinder intake ports, and fuel injection means operated in timed relation with said crankshaft and constructed to inject the fuel into said transfer passage, said fuel injection means including means directing the fuel spray in a direction opposed to the flow of air through said transfer passage to create turbulence in said fuel and air mixture introduced to said engine cylinder.

5. A two stroke cycle internal combustion engine of the crankcase compression type comprising an engine structure including a crankcase, a crankshaft, a cylinder having intake and exhaust ports, and an air transfer passage connecting the crankcase with said cylinder and having an inlet and an outlet opening in the cylinder wall, a piston operatively connected with said crankshaft and including a skirt portion, said piston skirt having a port arranged to be moved into registration with the transfer passage inlet only near the end of the explosion stroke to place the engine cylinder into open communication with the compressed air in said crankcase, whereby to inject air under pressure to said engine cylinder, and fuel injection means timed to inject fuel directly into the compressed air being introduced into said engine cylinder and just prior to the actual compression stroke of the engine.

6. A two stroke cycle internal combustion engine of the crankcase compression type comprising an engine structure including a crankcase, a crankshaft, a cylinder having intake and exhaust ports, and an air transfer passage connecting the crankcase with said cylinder and having axially spaced inlet and outlet openings in the cylinder wall, a piston operatively connected with said crankshaft and including a skirt portion, said piston skirt having a port arranged to be moved into registration with the transfer passage inlet only near the end of the explosion stroke to place the engine cylinder into opening communication with the compressed air in said crankcase, whereby to inject air under pressure to said engine cylinder, and fuel injection means timed to inject fuel directly into the compressed air being introduced into said engine cylinder and just prior to the actual compression stroke of the engine, said fuel injection means including a fuel outlet jet positioned in proximity to said transfer passage outlet and to said cylinder intake ports.

7. In a two stroke cycle fuel injection spark ignition engine of the crankcase compression type, an engine structure having a recessed pocket on one side thereof and including a cylinder adjacent to said pocket and having intake and exhaust ports, a crankcase, an air transfer passage connecting said crankcase with a cylinder intake port, a piston operable to control said cylinder ports, and fuel injection means mounted in said recessed pocket on the side of said engine structure and including a fuel jet positioned in proximity to a cylinder inlet port, said injection means being operable in timed relation to said engine operation to inject fuel only when said piston has unmasked the cylinder intake ports.

8. A two stroke cycle engine of the fuel injection spark ignition type comprising a cylinder having an air intake port and an exhaust port, means controlling the opening and closing of said cylinder intake and exhaust ports, means supplying air to said cylinder intake port, and relatively low pressure fuel injection means including control means operated in timed relation with said exhaust port controlling means to inject fuel at relatively low pressure at the beginning of the engine compression stroke at pressures which are substantially less than the maximum cylinder pressures obtained prior to ignition and approximately immediately after the exhaust port is closed, said fuel injection control means being operable to shut off fuel injection while cylinder pressures are still less than fuel injection pressures.

9. A two stroke cycle engine of the fuel injection spark ignition type comprising a cylinder having an air intake port and an exhaust port, means controlling the opening and closing of said cylinder intake and exhaust ports, means supplying air to said cylinder intake port, and fuel injection means including control means operated in timed relation with the engine operation to inject fuel into said engine cylinder at relatively low pressures which are substantially less than the maximum cylinder pressures obtained prior to ignition and commencing approximately at the beginning of the compression stroke and continuing to from fifty per cent (50%) to ninety per cent (90%) of said compression stroke, said fuel injection control means being operable to shut off fuel injection while cylinder pressures are still less than fuel injection pressures.

10. A two stroke cycle engine of the fuel injection spark ignition type comprising an engine structure including a cylinder having intake and exhaust ports, a piston operable in said cylinder to control at least in part said cylinder intake and exhaust ports to control the engine cyclical events, means supplying pure air to said cylinder intake port, and fuel injection means associated with and injecting fuel directly into said cylinder, said fuel injection means positioned in said cylinder wall at a point axially spaced outwardly of the cylinder with respect to said exhaust port, said fuel injection means operable in timed relation with said engine to inject said fuel during the engine compression stroke, said piston operable to mask said fuel injection means during at least the last ten per cent (10%) of the compression stroke and likewise during the initial portion of the power stroke whereby to shield said fuel injection means from the substantial maximum temperatures and pressures in said cylinder.

11. A two stroke cycle engine of the fuel injection spark ignition type comprising an engine structure including a cylinder having intake and exhaust ports, a piston operable in said cylinder to control at least in part said cylinder intake and exhaust ports, air supply means externally of said engine and operable as the only source of air supply to supply pure air under pressure to the cylinder intake port, and fuel injection means in said cylinder wall and spaced axially outwardly of the cylinder with respect to the cylinder exhaust port, said fuel injection means introducing the fuel under pressure to the engine cylinder at pressures substantially less than cylinder pressures obtained prior to ignition, said fuel injection means including control means and operable in timed relation with said engine to inject fuel into said cylinder approximately following the closing of the cylinder exhaust port and during a portion only of the engine compression stroke, said fuel injection control means operable to shut off fuel injection while cylinder pressures are still less than fuel injection pressures.

12. A two stroke cycle engine of the fuel injection spark ignition type comprising an engine structure including a cylinder having intake and exhaust ports, a piston operable in said cylinder to control at least in part said cylinder intake and exhaust ports, air supply means operable to supply pure air under pressure to the cylinder intake port, and fuel injection means including control means operable in timed relation with said engine to inject relatively low pressure fuel directly into the engine cylinder during a portion only of the engine compression stroke at pressures less than the maximum cylinder pressures obtained prior to ignition, said fuel injection control means operable to shut off fuel injection while cylinder pressures are less than the fuel injection pressure.

13. A two stroke cycle internal combustion engine comprising an engine structure including a crankcase and a cylinder, said cylinder having intake and exhaust ports, a crankshaft, a piston operatively connected with said crankshaft and operable to control the opening and closing of the cylinder intake and exhaust ports to control the engine cyclical events, means for introducing pure compressed air into said cylinder intake ports, and means for introducing fuel directly into the cylinder at the beginning of the engine compression stroke, said fuel injection means including a fuel nozzle constructed and arranged to direct the injected fuel transversely of the flow of air as the same is being introduced into the cylinder.

14. A two stroke cycle internal combustion engine comprising an engine structure including a crankcase and a cylinder, said cylinder having intake and exhaust ports, a crankshaft, a piston operatively connected with said crankshaft and operable to control the opening and closing of the cylinder intake and exhaust ports to control the engine cyclical events, means for introducing pure compressed air into said cylinder intake ports, and means for introducing fuel directly into the cylinder at the beginning of the engine compression stroke, said fuel injection means including a fuel injection nozzle projecting into a cylinder intake port and constructed and arranged to inject said fuel directly into the engine cylinder and to direct said fuel substantially tangentially relative to the cylinder wall.

ENOS R. JACOBY.
EARL GINN.